United States Patent

Midgley et al.

[15] 3,679,980

[45] July 25, 1972

[54] SOLID STATE TELEVISION TUNER WITH VOLTAGE VARIABLE CAPACITORS

[72] Inventors: Edward L. Midgley, Carol Stream; Reuben C. Carlson, Bloomingdale, both of Ill.

[73] Assignee: Standard Kollsman Instrument Corporation, Melrose Park, Ill.

[22] Filed: July 7, 1969

[21] Appl. No.: 839,167

[52] U.S. Cl. ..........325/464, 325/452, 334/15

[51] Int. Cl. ..........H04b 1/16

[58] Field of Search ..........325/452, 453, 457, 458, 459, 325/461, 464, 465; 334/15

[56] References Cited

UNITED STATES PATENTS 3,233,179 2/1966 Klettke ..........325/457 X 3,109,995 11/1963 Wargo ..........325/453 X 3,528,043 9/1970 Richter et al. ..........325/464 X

*Primary Examiner*—Robert L. Richardson

*Attorney*—E. Manning Giles, J. Patrick Cagney and Peter S. Lucyshyn

[57] ABSTRACT

A solid state television tuner is disclosed herein. Actuation of a channel selector mechanism to one of a plurality of channel selection settings connects a distinctive level of voltage to a wide band signal selecting circuit. The signal selecting circuit includes a resonant circuit having solid state voltage variable capacitance that is selectively controllable in accordance with the level of applied voltage. A different voltage level is connected for each of the channel selection settings and each is independently controllable through actuation of preset tuning mechanism only when connected for effecting fine tuning of the channel.

2 Claims, 18 Drawing Figures

INVENTORS
Edward L. Midgley
Reuben C. Carlson
BY J. Patrick Cagney
ATTORNEY

INVENTORS
Edward L. Midgley
Reuben C. Carlson
BY J. Patrick Cagney
ATTORNEY

INVENTORS
Edward L. Midgley
Reuben C. Carlson

BY J. Patrick Cagney
ATTORNEY

Inventor
Edward L. Midgley
Reuben C. Carlson
By J. Patrick Cagney Atty

Inventors
Edward L. Midgley
Reuben C. Carlson
By J. Patrick Cagney
Atty.

SOLID STATE TELEVISION TUNER WITH VOLTAGE VARIABLE CAPACITORS

BACKGROUND OF THE INVENTION

In the United States, the government has allocated three ranges or bands in the electromagnetic radio spectrum for television broadcast and reception. These are from 54 to 88 megahertz (MHz), from 174 to 216 MHz, and from 450 to 890 MHz. These ranges or bands are further divided into individual channels, each being 6 MHz wide. There are thus five channels in the first band, seven in the second, and seventy in the third band. By convention also, the lowest frequency channel, that is from 54 to 60 MHz, is designated channel 2 while each progressively higher channel frequency is designated by the next highest number. Thus, channels 2–6 are in the first band, channels 7–13 in the second band and channels 14–83 in the third band.

The lower two bands (channels 2–13), despite the gap between them, are conventionally referred to as a single band, namely, the Very High Frequency or VHF band. The other band (channels 14–83) is referred to as the Ultra High Frequency or UHF band.

Because of the great disparity between the VHF and UHF frequency ranges, it is the normal practice to employ two separate tuners in a television set designed to receive the VHF and UHF bands. Recently, solid-state tuners have been developed which tune to desired frequencies or channels in response to the application of voltages of various levels. Examples of such tuners are disclosed in the following applications:

1. Gossard, et al., application Ser. No. 671,011, filed Sept. 27, 1967, and entitled SOLID STATE TELEVISION TUNER, now abandoned.
2. Manicki application Ser. No. 839,169, filed coincidently herewith and entitled SOLID STATE TUNED VHF TELEVISION TUNER.

Each of the above-referred to applications are assigned to the assignee of the present invention, and the disclosures, to the extent not inconsistent herewith, are specifically incorporated herein by this reference.

As stated in detail in the above-reference applications, the solid-state tuners disclosed in each incorporate resonant circuitry having voltage responsive variable reactance means comprising voltage variable capacitance selectively controlled by predetermined levels of applied voltage to tune the resonant circuitry to a corresponding number of frequency channels. It is a characteristic of the resonant circuitry utilized in the solid-state tuners that the applied voltage-to-frequency response relationship is nonlinear. Thus, for example, a typical solid-state tuner capable of tuning all UHF channel frequencies may require a voltage range of 5 volts to tune from 470 MHz to 615 MHz, while a voltage range of 15 volts is required to tune from 615 MHz to 790 MHz.

The characteristic of non-linearity, plus the requirement imposed by the government that each television set sold in the United States be capable of tuning to all possible channels, has posed considerable difficulties with regard to the construction of inexpensive, durable and compact controls for use with the solid state tuner circuitry. Adding to the difficulties encountered are factors which include the desirability of providing a single tuner control having the capability of selecting both VHF and UHF channels free of the "homing-in" process of channel selection characterized by the present UHF tuner systems, and the desirability of providing a control affording preset fine tuning.

SUMMARY OF THE INVENTION

A solid state television tuner in accordance with the present invention includes channel selecting mechanism, a plurality of channel selection settings individually selectable through actuation of the selector mechanism, a wide band signal selecting circuit having tunable resonant circuit facility including a solid state voltage variable capacitance selectively controllable in accordance with the level of applied voltage, and a variable voltage source responsive to the selector mechanism for providing a predetermined distinctive level of applied voltage for each channel setting. The voltage source includes voltage dividing taps at each channel selection setting and connectable to the voltage variable capacitance when said selector mechanism is actuated to the corresponding channel selection setting, and preset tuning facility adjustable for independently controlling only the particular voltage tap that is connected to the variable voltage capacitance for effecting fine tuning.

In one embodiment the selector mechanism includes a disc shaped thumbwheel which is rotatable to a plurality of detent positions, each position corresponding to a channel selection setting. The variable voltage source comprises a single strip of resistive material having two spaced-apart end regions. Facilities are provided for maintaining a first level of voltage at one of the regions and a uniform second level of voltage at the other of the regions to provide a voltage gradient between the regions.

In another embodiment of the solid state tuner of the present invention, the selector mechanism includes a plurality of pushbuttons, each corresponding to a channel selection setting.

In accordance with the present invention, a solid state television tuner combination comprises a first wide band signal selecting circuit having a predetermined range of frequency channels, a second wide band signal selecting circuit having a predetermined range of frequency channels, each of said signal selecting circuits having tunable resonant circuit means including a solid state voltage variable capacitance controllable in accordance with the level of applied voltage, selector mechanism facilities providing a plurality of channel selection settings individually selectable through actuation of the selector mechanism and comprising a separate setting for each frequency channel of each of the ranges. A tuning voltage bus is connectable to each of the signal selecting circuits. A variable voltage source, responsive to the selector mechanism, provides a predetermined distinctive level of voltage to the bus for each channel selection setting. and switching means, responsive to said selector mechanism, connects the bus to the signal selecting circuit that includes the frequency channel that is determined by the voltage level applied to the tuning bus.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION

GENERAL ARRANGEMENT

Figure 1:
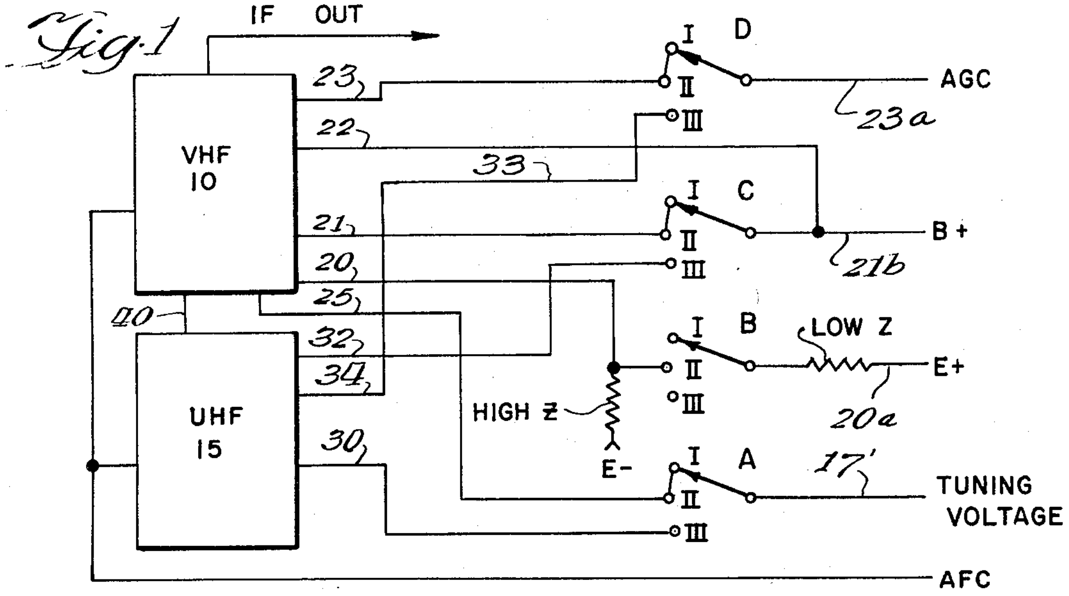
FIG. 1 is a schematic and functional diagram showing the general arrangement of and circuitry for controlling the modes of solid state voltage responsive types of VHF and UHF tuners.

Referring now to the drawings and specifically to FIG. 1, there is shown a tuner system including a VHF tuner 10 and a UHF tuner 15 which, as indicated previously, are voltage responsive types of solid-state circuits. In the VHF tuner 10, the channels are arranged in a low frequency band (channels 2–6) and a high frequency band (channels 7–13). The VHF tuner incorporates a resonant circuit having parallel inductances arranged so that a permanent inductance is operative to determine the low frequency band. A shunt high frequency inductance is switched into operation to act in conjunction with the permanent inductance in determining the high frequency band. In the UHF tuner 15, the channels are arranged in an ultra high frequency band (channels 14–83).

As described in the copending applications referred to above, the tuners 10, 15 have three modes of operation which conveniently can be described with reference to four schematic switches A,B,C and D as follows:

1. A low band VHF mode which is selected when the switch blades are at position I;
2. A high-band VHF mode which is determined when the switch blades are at position II;
3. A UHF mode which is selected when the switch blades are at position III;

As described in the above reference applications, tuning in the low-band of the VHF tuners is controlled solely by the applied voltage on line 25 in FIG. 1, but tuning in the highband is controlled both by the applied voltage in line 25 and by the switch B, which is operable to direct voltage of either polarity to line 20 to the positive voltage bus 20A whereby the shunt inductance of the VHF tuner is in circuit. For low-band operation the switch B is closed to the position I to allow a reverse voltage from bus 20B to feed line 20 and thereby block out the circuit connection to the shunt inductance.

The VHF tuner circuitry in FIG. 1 further includes a conventional AGC supply line 23 which is connectable to an AGC supply bus 23A through switch D. A B+ power supply bus 21B is linked to a mixer B+ line 22 and is connectable by switch C to an OSC and RF B+ line 21.

The UHF tuner 15 includes a conventional AGC supply line 34 which is connectable to the AGC supply bus 23A through line 33 by switch D. The UHF tuner receives power through the B+ power supply line 32 which is connectable to the B+ power supply bus 21B by switch C.

The VHF tuner 10 receives tuning voltage through line 25 which is connectable by switch A to tuning voltage supply bus 17'. Switch A also serves to connect tuning voltage supply bus 17' to the UHF tuner 15 through voltage line 30.

Typically, the IF frequency output of the UHF tuner is amplified by using portions of the VHF IF frequency amplification circuitry. Accordingly, line 40 carries the UHF IF frequency signal to the IF amplifier portion of the VHF tuner circuit.

Figure 2:
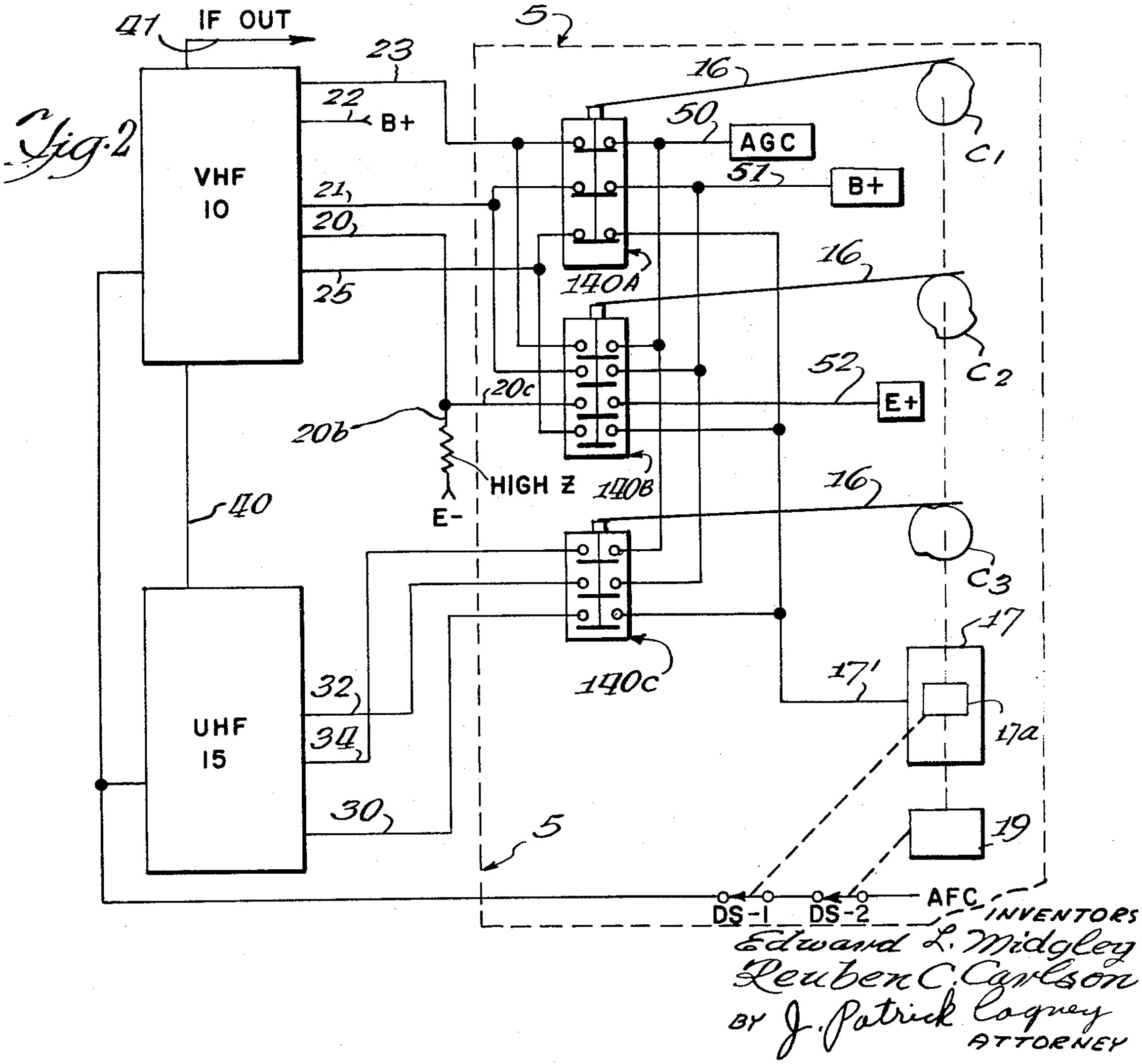
FIG. 2 is a schematic and functional diagram showing a tuner control for controlling the mode and individual channel tuning of solid state VHF and UHF tuners in accordance with the present invention.

Turning to FIG. 2, there is shown diagrammatically a tuner control 5 for controlling the mode of tuners 10, 15 as well as the voltage levels to be applied to the tuners for individual UHF and VHF channel selection.

In accordance with the present invention, the tuner control 5 includes a selector mechanism 19 which, as will be explained below, has a plurality of UHF and VHF channel selection settings. A variable voltage source 17 is mechanically ganged (as indicated by the dotted line) to the selector 19 and is responsive to the actuation of the selector 19 from channel setting to channel setting to provide selective predetermined tuning voltage levels to voltage bus 17'. Each tuning voltage level so provided corresponds to one of the channels and such voltage level will be produced each time the selector 19 is actuated to such setting.

In accordance with a particular aspect of the invention, each of the voltage levels is independently controllable through actuation of the preset tuning mechanism 17A for effecting fine tuning. As will be explained, the preset tuning mechanism 17A is operable to vary only the voltage level which is being provided to voltage bus 17'. Thus, once the voltage level corresponding to a channel setting has been fine tuned (when at the selected channel position), it will remain so until the viewer actuates the selector 19 to the same channel setting and again actuates the preset tuning mechanism 17A.

For controlling the mode of the tuners 10, 15 the tuner control 5 of FIG. 2 is shown to include three conventional two-position, multi-pole switches, 140A, 140B and 140C. As will be apparent, these switches perform the switching functions of schematic switches A,B,C and D of FIG. 1 as described above. Such is accomplished by providing each of the switches with an input AGC line which is connected in parallel with the AGC supply bus 50. Similarly, each of the switches is provided with B+ and tuning voltage input lines which are respectively parallel connected with B+ supply bus 51 and tuning voltage line 17'. In addition, switch 140B has an E+ lead input 52 to provide for band switching in the VHF tuner 10.

As shown, the VHF tuner 10 has its AGC supply line 23 connected in parallel with switches 140A and 140B. Similarly, VHF tuner 10 receives B+ and tuning voltage along lines 21, 25 which are respectively connected in parallel with switches 140A and 140B. As stated above, the polarity of the voltage along VHF band switching voltage line 20 is shown to be controlled by switch 140B. Thus, switch 140A, when closed, determines the low-band VHF mode, while switch 140B, when closed, determines the high-band VHF mode.

The UHF mode is controlled through switch 140C, which, when closed, connects the tuning voltage line 30 to tuning voltage line 17' and which connects AGC and B+ lines 32 and 34 respectively to AGC supply line 50 and B+ supply line 51.

In order to control the opening and closing of the individual switches 140A, 140B and 140C, three corresponding cams C1, C2 and C3 are shown mechanically ganged to the variable voltage source 17 and selector 19. Each of the cams controls the opening and closing of one of the switches by means of a cam follower 16. As shown in FIG. 2 each of the cams has a raised cam lobe portion. When the cam follower of one of the switches 140A, 140B and 140C engages the cam lobe portion of its corresponding cam, such switch will be forced to its closed position. As indicated by the dotted line, the cams C1, C2 and C3 are mechanically ganged to each other and to the variable voltage source 17 and selector 19 so that, when the selector 19 is actuated to a particular channel, only that switch which controls the mode of tuners 10, 15 corresponding to the selected channel will be closed. Thus, for example, FIG. 2 shows the relationship of the switches and cams when one of the low-band VHF channels has been selected.

As will be appreciated by one skilled in the art, the tuners 10, 15 can optionally be provided with conventional AFC to prevent frequency drift in the oscillator stage. Because tuners 10, 15 are voltage responsive as stated above, it is important to cut-out or defeat the AFC when switching to a channel and when fine tuning a channel.

A particular aspect of the tuner control 5 of the present invention resides in the use of a pair of series connected AFC defeat DS-1 and DS-2. As indicated by the dotted lines, defeat switch DS-2 is ganged to the selector mechanism 19 so that the defeat switch is opened whenever the selector 19 is in a "-between channel" position. The defeat switch DS-1 is shown mechanically ganged to the fine tuning mechanism 17A so that the switch is open during the fine tuning of the selected channel.

EMBODIMENT OF FIGS. 3–10

Figures 5, 6, 7, 10:
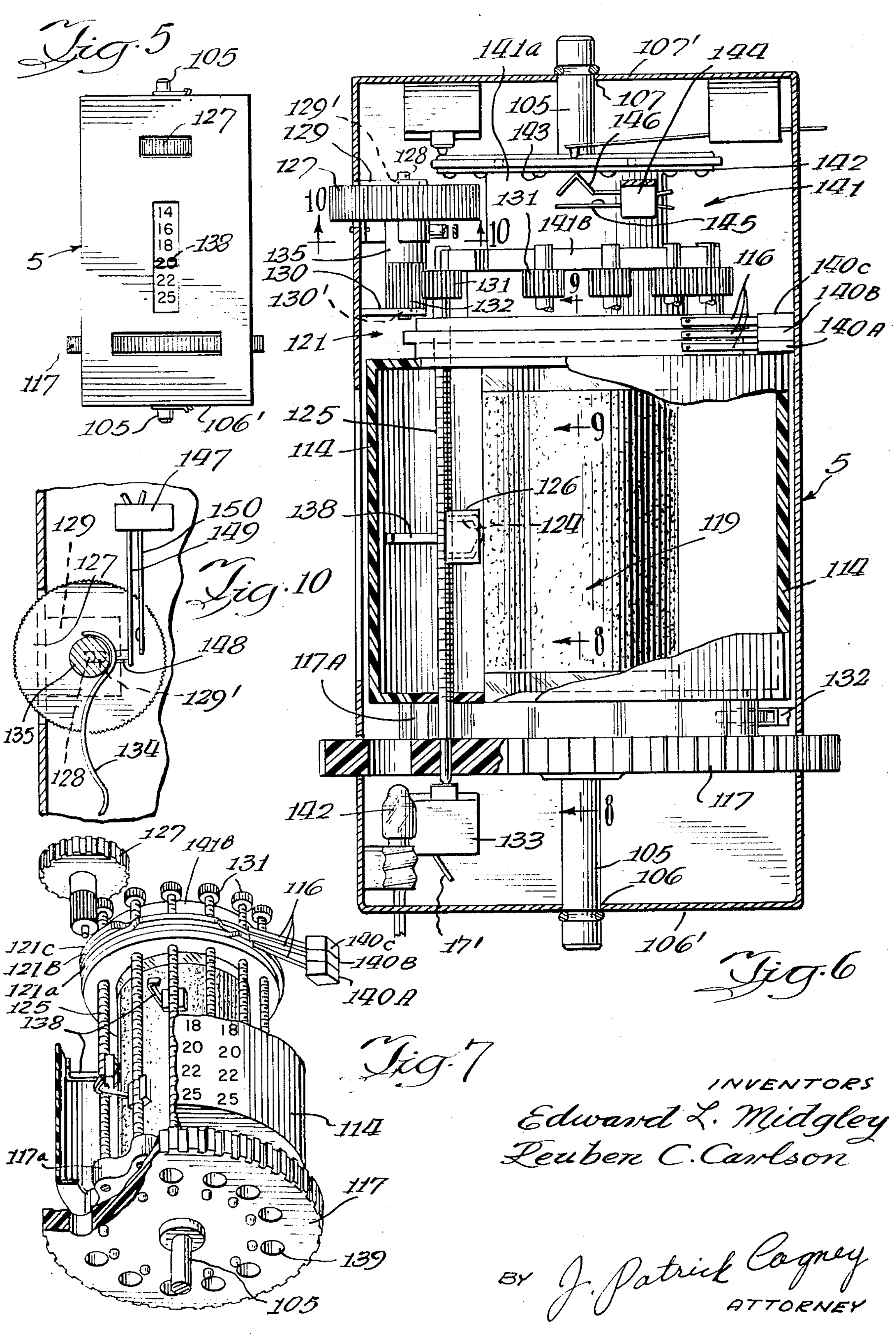
FIG. 5 is a front elevational view of one embodiment of the tuner control of FIG. 2 and shows the selector thumbwheel, fine tuning dial, and channel readout.
FIG. 6 is a side elevational view of the tuner control of FIG. 3 with the housing wall cut away to reveal the interior.
FIG. 7 is a partial perspective view of the tuner control embodiment of FIG. 3.
FIG. 10 is a sectional view taken as indicated on the line 10—10 of FIG. 6.

Turning now to FIGS. 3–10, there is shown one embodiment of the schematic tuner control 5 of FIG. 2. In FIG. 5, the tuner control 5 is shown as it would normally be seen located at the front of a TV receiver cabinet. To select any desired UHF or VHF channel, the viewer need only rotate thumbwheel 117. As will be explained in detail below, thumbwheel 17 is provided with a number of equally spaced detented channel selection settings so that the viewer can switch to any desired VHF or UHF channel through rotation of thumbwheel 117 from detent position to detent position. If it is necessary to fine tune the selected channel the viewer need only to press and rotate the fine tuning knob 127, as will be described below.

Figures 3, 4, 8, 9, 14, 15:
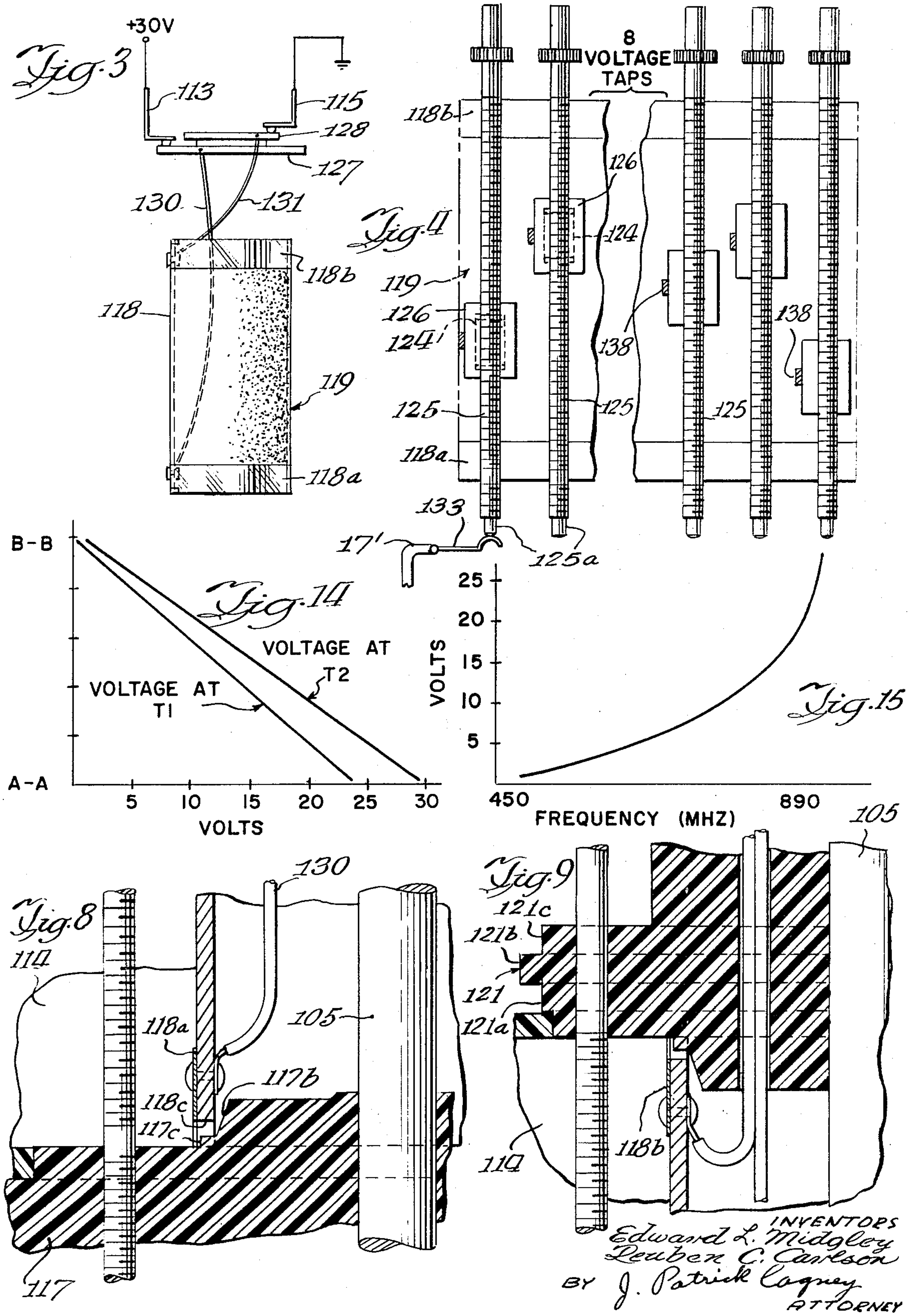
FIG. 3 is a fragmentary elevational view showing the resistive drum and illustrating the manner of providing an axial voltage gradient thereacross.
FIG. 4 is a partial fragmentary view showing a development of the resistive drum of FIG. 4 and showing a number of the lead screws and voltage taps.
FIG. 8 is a sectional view as indicated on the line 8—8 of FIG. 6.
FIG. 9 is a sectional view taken as indicated on the line 9—9 of FIG. 6.
FIG. 14 is a plot of the voltage range across the fine tuning variable resistor as a function of the position of the ganged tap arms of a typical tuning bridge of FIG. 13.
FIG. 15 is a plot of a voltage-to-frequency response curve of a typical solid state voltage responsive UHF tuner.

Referring to FIGS. 6 and 7, thumbwheel 117 is shown rigidly supported by shaft 105 which, in turn, is rotatably supported in suitable mounting slots 106, 107 located in opposite tuner control housing end walls 106', 107'. As best shown in FIGS. 7 and 8, thumbwheel 117 includes an annular detented flange portion 117A which, in cooperation with detent roller assembly 132, provides a plurality of detent positions, each of which corresponds to one of the channel selection settings.

As best shown in FIGS. 3 and 4, the variable voltage source 17 of FIG. 2 includes resistive drum 119 comprising a cylinder 118 of dielectric material having a thin outer coating of resistive material. The two opposite outer end regions 118*a*, 118*b* of the resistive drum 119 are silvered. An axial voltage gradient exists across the resistive material of drum 119 by electrically connecting silvered region 118*a* through line 130 to a source of voltage, and by connecting region 118 *b* through line 131 to ground. As will be explained in greater detail below, lines 130, 131 are respectively connected to a pair of mutually insulated wiper plates 127, 128. A regulated D.C. current is transmitted to wiper plate 127 by wiper contact 113, while wiper plate 128 is effectively grounded by wiper contact 115.

In order to provide tuners 10, 15 with the voltage levels which are necessary to cause the tuners to tune to selective VHF and UHF channels, a plurality of lead screw structures 125, which comprise voltage bus bars, are mounted adjacent the exterior surface of drum 119. As best shown in FIG. 4, which is in "unwrapped" view of drum 119 of FIG. 3, each of the lead screws 125 carries a contactor 124 by means of a threaded jacket 126. As shown, each of the contractors 124 is positioned axially along drum 119 so as to transmit a predetermined level of voltage to its corresponding lead screw 125. Thus, the end portion 125*a* of each lead screw 125 carries a voltage which corresponds to a required voltage level necessary to cause the tuners 10, 15 to tune to a desired channel frequency. As will be explained in detail below, as the viewer selects a desired channel, the lead screw 125 carrying the voltage level corresponding to the selected channel will be brought into contact with wiper contact 133 and thence to the proper of tuners 10, 15.

Such is accomplished, as shown in FIGS. 6 and 8 by rigidly mounting the resistive drum 119 in axial alignment to thumbwheel 117 for rotation therewith. For this purpose thumbwheel 117 is shown having an annular wedge-like portion 117B over which is seated the end portion 118*a* of drum 119. To prevent relative rotational movement between drum 119 and thumbwheel 117, the edge of end portion 118*a* has a carved out segment 118*c* which is fitted about a notch 117*c* of wedge portion 117B. The end portion 125A of the lead screws 125 are reduced in diameter and are shown received and extending through mounting slots provided in thumbwheel 117. The wiper contact 133 is shown mounted adjacent the thumbwheel opposite the drum 119. Thus, as the thumbwheel is caused to rotate from detent to detent, the end portion 125A of each of the lead screws 125 is successively snapped into firm contact with contact 133. As stated, each lead screw 125 acts as a voltage bus bar and, as such, transmits the voltage level of its voltage tap 124 through wiper contact 133 and tuning voltage bus 17' to the proper of tuners 10, 15.

In order to control the mode of tuners 10, 15 as described with reference to the diagrammatic of the tuner control of FIG. 2 a cam structure 121 is shown axially aligned and rigidly mounted to shaft 105. As best shown in FIG. 9, cam structure 121 includes an annular wedge-like portion 121' which supports the end portion 118*b* of drum 119. As shown, each of the lead screws 125 is received and extends through a suitable mounting slot provided in cam structure 121. Thus, rotation of thumbwheel 117 results in corresponding rotation of drum 119, cam structure 121 and lead screws 125.

As best shown in FIGS. 7 and 9, cam structure 121 includes a series of three axially spaced disc portions 121A, 121B and 121C, each having an edge raised cam lobe surface. As will be explained, the three disc portions serve to provide the switch control functions outlined above in the discussion of the cam discs C1, C2 and C3 of FIG. 2.

Three switches 140A, 140B and 140C respectively comprising the two-position multi-pole switches as described with reference to FIG. 2 are shown mounted (FIG. 6) in side-by-side arrangement to control housing wall 108' adjacent the cam structure 121. As shown, each of the switches has a cam follower 116 at all times in contact with a corresponding of the cam disc portions 121A, 121B and 121C.

In the typical application disclosed herein, tuner control 5 of FIGS. 3–10 is shown provided with a thumbwheel 117 having 13 detent positions corresponding to an equal number of channel selection settings. Each detent position presents a corresponding lead screw 125 into contact with wiper contact 133, thereby determining the level of voltage of tuning voltage bus 17'. The 13 detent positions are programmed to the tuners 10, 15 by switches 140A, 140B, and 140C, as activated by the cam discs of cam structure 121 as follows:

1. Adjacent detent positions 1–3 correspond to three channels in the VHF low-band of channels 2–6. Rotation of thumbwheel 117 to each of these detent positions presents to wiper contact 133 a lead screw 125 having tap arm 124 which has been prepositioned along drum 119 so as to provide a voltage level in correspondence to one of the low-band VHF channels. During this time, cam discs 121A, 121B, 121C are caused to rotate to a position so that the raised cam lobe surface of disc 121A is in engagement with the cam follower of switch 140A thereby closing the switch. During this mode the raised cam lobe surfaces of discs 121B and 121C do not engage the cam followers of switches 140B and 140C thereby causing these switches to remain open.
2. Adjacent detent positions 4–7 correspond to 4 channels in the VHF high-band of channels 7–13. These detent positions each presents a lead screw into contact with wiper contact 133 providing a voltage level corresponding to one of the VHF high-band channels desired. During this mode, the cam disc structure is caused to rotate so that the raised cam lobe surface of cam disc portion 121B engages the cam follower of its corresponding switch 140B while the lobe surfaces of disc portions 121A and 121C assume a disengaged position relative to the cam followers of their corresponding switches 140A and 140C.

3. The remainder of the detent positions, 8–13, corresponds to six UHF channels. Each of these detent positions presents to wiper contact 133 a lead screw 125 having a tap arm 124 which has been prepositioned along drum 119 so as to provide a voltage in correspondence to one of the UHF channels. During this mode, cam structure 121 is caused to rotate so as to present the raised cam lobe surface 121C into engagement with the cam follower of switch 140C while lobe surfaces 121A and 121B assume a disengaged relationship relative to the cam followers of switches 140A and 140B.

This arrangement would permit the consumer to program his television set to all local channels as present assigned in the United States. If the consumer moves from one locale to another, he need only to reposition the voltage taps 124 along drum 119 to provide a set of voltage levels in accordance with the channel frequencies of the new locale.

It should be noted that a relatively small variation in voltage in the UHF mode effects a relatively large range of frequency response in tuner 15, especially at the lower frequency UHF levels (see FIG. 15). For this reason, as well as for convenience of the viewer, it is highly desirable to provide preset fine tuning capability.

In the tuner control embodiment of FIGS. 3–10, preset fine tuning is achieved by providing means for rotating the lead screw structure that is at the selected channel setting (i.e. the lead screw which is in contact with contactor 133), thereby causing the threaded jacket 126 and voltage tap 124 to move axially along drum 119. As stated, an axial voltage gradient exists across drum 119 so that axial movement of the voltage tap 124 produces a variation in the level of voltage transmitted to the corresponding lead screw 125.

To provide for rotation of the lead screws 125, each has a gear 131 which is individually driven when at the selected channel setting by urging the fine tuning dial 127 inwardly of the tuner control housing, thereby forcing pinion 132, which is rigidly mounted to the drive shaft 127A of dial 127, into engagement with gear 131. Normally pinion 132 is maintained in disengaged relationship with the gears 131 by leaf spring 134 which is shown having one end fixed to the control housing wall and another end in journaled engagement with bearing surface 135 of shaft 128. To allow for inward movement of the fine tuning dial 127, the two opposite end portions of shaft 128 are received in elongated slots 129', 130' provided in the supporting panels 129, 130.

Axial movement of the lead screw structures 125 is effectively prevented by providing a lead screw end thrust support 141, which is secured adjacent cam structure 121 for rotation therewith. The end thrust support 141 includes a disc-shaped portion 141A which seats the end region 125B of each of the lead screws 125 adjacent gears 131. The support 141 additionally has a hollow cup-shaped extension 141B providing a surface mounting for the disc-shaped wiper plates 127, 128.

In order to provide for AFC defeat capabilities an annular ring 142 is secured to the cup-shaped extension 141B which provides an annular array of equally spaced nodes 143. An AFC defeat switch 144 is rigidly mounted adjacent the nodes 143 of ring 142. As described with reference to the schematic switch DS-2 of FIG. 2 above, switch 144 functions to deactivate the AFC whenever the viewer is in the process of switching from channel to channel. As shown, switch 144 has a pair of arms 145, 146. Arm 146 is resilient and has a cammed end portion so that as the annular ring is caused to rotate during channel selection, the nodes 143 sequentially engage the cammed portion of arm 146 thereby forcing arm 146 into engagement with arm 145 to ground out the AFC. The spacing of the nodes is such that whenever the control is at a selected channel position the cammed portion of resilient arm 146 will be between adjacent nodes 143 thereby allowing arms 146, 145 to be separated whereby the AFC is activated.

Referring to FIG. 10, a similar fine tuning AFC defeat switch 147 (corresponding to defeat switch DS-1 of FIG. 2) is shown mounted adjacent the fine tuning dial 127 so that whenever dial 127 is in a depressed condition, a projection 148 of the biasing spring 134 will cause resilient arm 149 of switch 147 to contact arm 150 thereby grounding out the AFC.

To facilitate channel selection by the viewer, a readout drum 114 of transparent material is shown rigidly mounted between thumbwheel 117 and cam disc portion 121 (FIGS. 6 and 7). A series of channel indication numerals are printed onto the transparent readout drum 114 directly above each lead screw structure 125. As shown in FIG. 5, the printed numbers are visible to the viewer at each channel setting through an opening 143 provided in the tuner control housing wall. A pointer 138 is shown mounted to each of the threaded jackets 126 to indicate to the viewer the channel at which the voltage tap arm 124 is set. To illuminate the readout drum 114, a series of holes 139 are provided in thumbwheel 117 so as to permit the entry of light from a source of light 142.

TUNER CONTROL EMBODIMENT OF FIGS. 11–18

Referring now to FIGS. 11–18, there is shown a pushbutton selector switch embodiment of the tuner control in accordance with the present invention.

Figure 11:
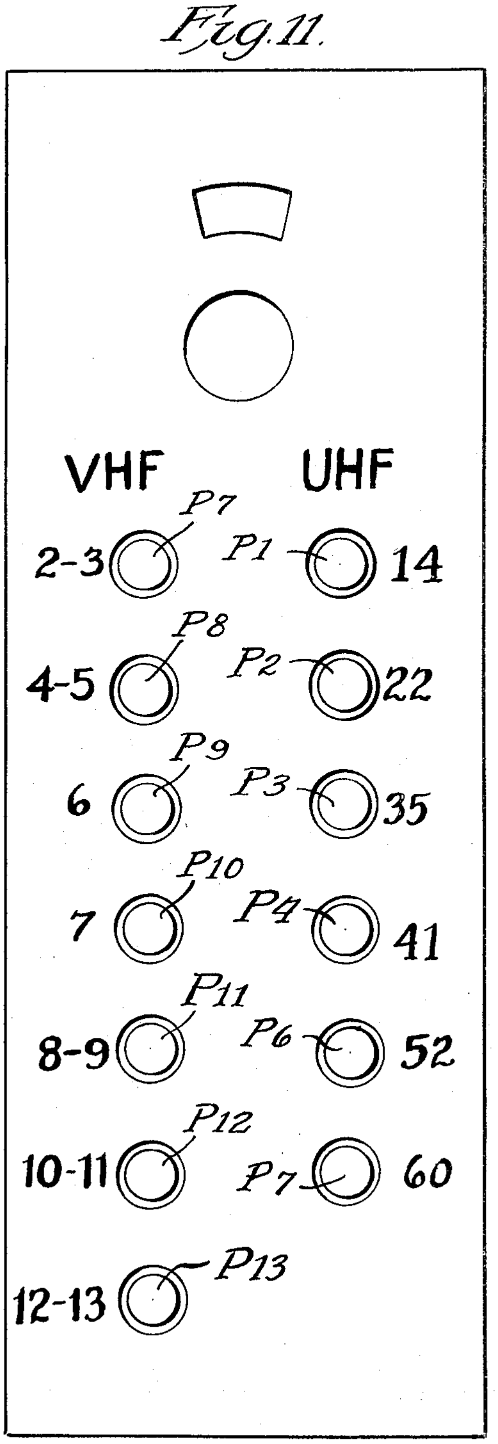
FIG. 11 is a front elevational view of any alternate embodiment of the tuner control of FIG. 2 and illustrates the mounting panel and an array of channel-selecting pushbuttons.

FIG. 11 shows the tuner control as it would normally be seen located at the front of a TV receiver cabinet. To select a desired UHF or VHF channel, the viewer need only push the corresponding of the push-buttons P1–P13. If it is necessary to fine tune the selected channel, the viewer need only rotate the corresponding push-button.

Figure 12:
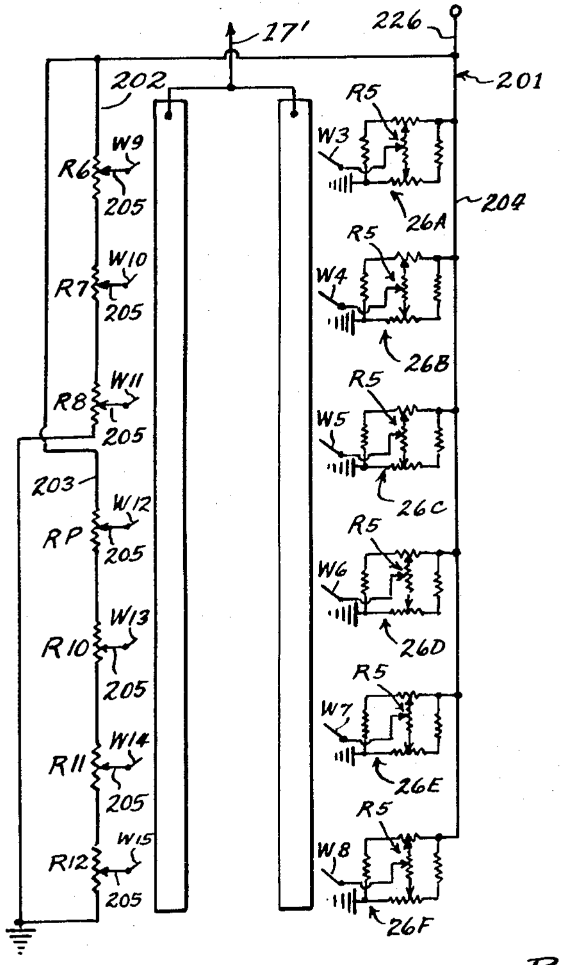
FIG. 12 is a schematic circuit diagram showing the voltage divider circuitry comprising the variable voltage source of the tuner control of FIG. 11.

Turning to FIG. 12, the push-button tuner control of the embodiment of the present invention is shown to include a voltage divider network 201 which is fed by a regulated D.C. supply bus 226. The voltage divider network includes three parallel branches 202, 203 and 204. Divider branch 202 includes resistors R6 to R8 connected in series to determine the tuning voltage to be applied for low-band VHF tuning. Divider branch 203 includes resistors R9 to R12 to determine the tuning voltage to be applied for highband VHF operation. Each of the variable resistors R6, R7 and R10–R12 provides a voltage range such that a full deflection of its voltage tap 205 provides a voltage range sufficient to cause the VHF tuner 10 to tune to two adjacent VHF channel frequencies. Thus, resistor R6 provides a voltage range corresponding VHF channels 2 and 3, resistor R7 a voltage range corresponding to VHF channels 4 and 5, and so on. Variable resistors R8 and R9 provide voltage ranges corresponding to VHF channels 6 and 7, respectively. Given the voltage to frequency characteristic of the VHF tuner 10 and the voltage input at bus 226, the required impedance values for variable resistors R6–R12 to accomplish such can be easily calculated by a person skilled in the art.

As shown, divider branch 204 includes a series of parallel connected tuning bridge circuits 26A–26F to determine the tuning voltage levels required for UHF operation. As will be explained in greater detail below, each of the tuning bridge circuits shown includes a resistor R5 of the conventional variable tap type. A particularly important aspect of each of the bridge circuits 26A–26F is that the voltage range across the resistive strip portion of resistors R5 of each of the bridge circuits can be adjusted to any predetermined one of a plurality of voltage ranges, each range being such as to affect a frequency range response of substantially constant magnitude in the resonant circuitry of UHF tuner 15.

Figure 13:
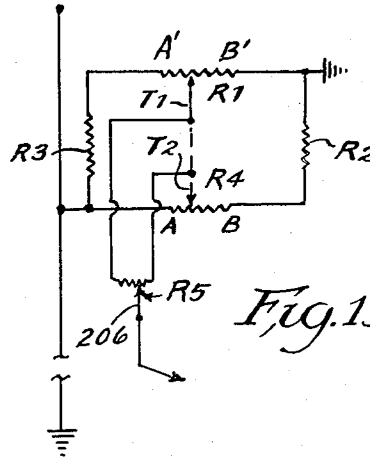
FIG. 13 is a circuit diagram of a tuning bridge circuit for controlling the voltage to be applied to the UHF tuner.

As best shown in FIG. 13, such is accomplished by feeding a constant source of voltage to parallel connected conventional variable resistors R1 and R4 having gang coupled respective tap arms T1 and T2 whose outputs are connected across the impedance strip of variable resistor R5. For ease of explanation, the tuning bridge circuit of FIG. 13 will be discussed where the variable resistors R1 and R2 are identical. In such a case it can be seen that by providing resistor R3 in series with variable resistor R1, and resistor R2 in series with variable resistor R4, the voltage gradient across the impedance strip of variable resistor R1 is made to differ from that across the impedance strip of variable resistor R4. Thus, as ganged tap arms T1 and T2 move from position A–A' towards position B–B' (FIG. 13), the magnitude of potential effected across the impedance strip of variable resistor R5 will be caused to vary. It will be noted that if resistor R3 provides an impedance which is large in comparison with the impedance of resistor R2, the potential across variable resistor R5 will be greatest when ganged tap arms T1 and T2 are located at positions A–A' and will become progressively smaller as the ganged tap arms move towards position B–B'.

FIG. 15 shows a tuning voltage to frequency response curve characterizing a typical UHF tuner 15. From FIG. 15 it is apparent that only a relatively small variation in voltage is necessary for tuning to adjacent UHF channels at the lower frequency levels, whereas a relatively large voltage variation is required to tune to adjacent UHF channels at the higher frequency levels.

FIG. 14 graphically shows the voltage levels at tap arms T1 and T2 as they are caused to traverse from position A–A' to position B–B' of a tuning bridge circuit fed by a constant 30 volt source, where R1=R4=50 k ohms, R3=33 k ohms, R4=1.8 k ohms and R5=20 k ohms. Comparing FIGS. 14 and 15, it will be seen that when tap arms T1 and T2 are at position A–A', the variable resistor R5 is adjustable to provide voltage levels of approximately 24–30 volts, whereas when the taps are moved to position B–B' variable resistor R5 is adjustable to provide voltage levels of approximately 0–1 volts. Thus, the ladder circuits 26A–26F effectively compensate for the nonlinearity of the voltage to frequency curve characteristic of tuner 15 as shown in FIG. 15. An important result of such effect is that approximately the same proportion of the length of the impedance strip (approximately one-sixth in the example above) of variable resistor R5 is available for fine tuning of any UHF channel.

Referring back to FIG. 12, divider branch 204 includes six ladder circuits 26A–26F, each having its ganged tap arms T1, T2 preset to effect a predetermined voltage range across the impedance strip of its resistor R5. Additionally the voltage tap 206 of each of the resistors R5 is preset to provide a predetermined level of voltage in accordance with one of the UHF channels to be selected.

As shown, each of the series connected resistors R6–R12, as well as each of the resistors R5 associated with the ladder circuits 26A–26F, has its tap arm 205 respectively connected to a spring-like contact or wiper leaf designated W3 to W15 respectively. The wiper leaves W3 to W8 are shown associated with a common latch bar 227 and wiper leaves W9 to W15 are shown associated with a second common latch bar 228, with both latch bars being connected in common to the tuning bus 17'.

Thus, when any single wiper leaf is actuated to establish contact with its corresponding latch bar, the latch bar applies a voltage determined by the location of the wiper leaf in its branch of the voltage divider network. As stated above, these voltages are predetermined in accordance with the required levels for tuning the VHF tuner section 10 and UHF tuner section 15.

Figure 17:
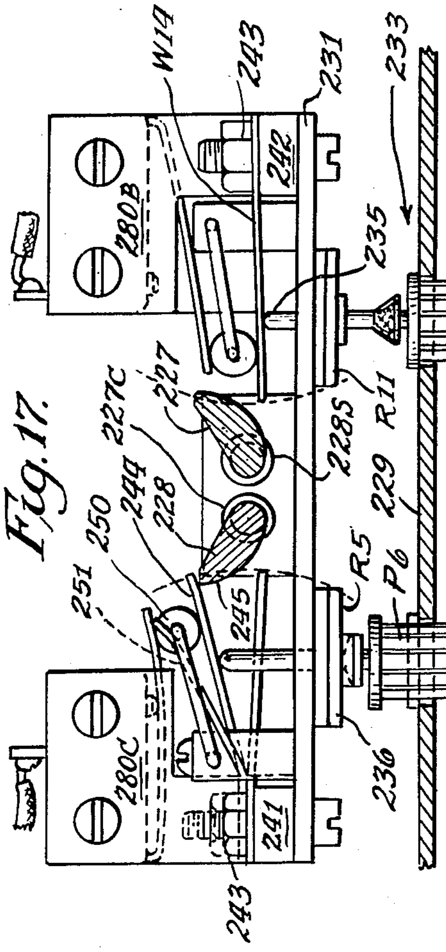
FIG. 17 is a transverse sectional view taken as indicated on the line 17—17 of FIG. 16.

The selector switch mechanism includes an apertured face panel 229 overlying a switch subassembly 230 (FIG. 17) which includes a base plate 231 that is anchored to bracket portions provided on the rear of the face panel 229. A mounting clearance 233 exists between the base plate 231 and the face plate 229 as best shown in FIG. 17 to accommodate the adjustable resistors R6-R12 and the resistors R5 of resistor circuits 26A to 26F at each channel position and the push-button actuators P1 to P13 at each channel position. As is best shown for the push-button P12 in FIG. 17, each of the channel push-buttons has a knurled cap or head portion 234 that projects through the face panel 229 and a shank portion 235 to project through the corresponding resistor R11 and abut a corresponding wiper leave W14.

Figure 18:
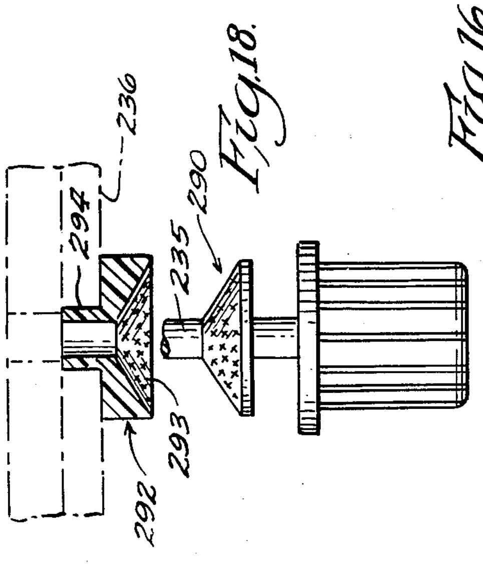
FIG. 18 is an enlarged fragmentary view illustrating the mechanical structure providing preset fine tuning.

Each of the resistors R5 and resistors R6–R12 include a collar 236 that is provided with a splined opening, such collar 236 also carrying the voltage tap arm 205 of the adjustable resistors. As best shown in FIG. 18, the shank portion 235 of each of the channel push-buttons has a cone shaped element 290 having a knurled exterior surface 291. A mating element 292 having a cone shaped interior portion 293 and a tubular portion 294 is shown in rotary keyed engagement with the collar 236 of each resistor. The internal diameter of the tubular portion 294 has a larger diameter than the diameter of shank portion 235 so that rotation of the push-button can be transmitted to rotation of collar 236 only when elements 290 and 292 are in mating engagement. Each button is normally held in its projected position as shown for the top push-button P12 of FIG. 17 at which time the two elements are disengaged. To select a channel, a corresponding button is depressed to a position as shown for the lower push-button P6 of FIG. 17 at which time the two elements assume a mating relationship. Thus, rotation of the push-button at the selected channel position effects fine tuning of the channel by varying the rotary position of the corresponding tap arm.

The base plate 231 is of any suitable insulation material and is provided with upper and lower bar-shaped bearing blocks 237 and 238, respectively, presenting aligned bores for reception of end-pivot stubs 227U, 227L on latch bar 227 and end-pivot stubs 228U, 228L on latch bar 228. Each of the lower pivot stubs 227L, 228L is provided with a drive gear 239 (FIG. 16), with the gears directly inter-engaging so that the latch bars 227, 228 rotate in unison between a normal spread position wherein they are outwardly flared and a relatively closed position. Each of the latch bars has a torsion spring 227S, 228S in coiled relation over its upper end stub, each torsion spring having one end biased against the base plate 231 and normally urging the latch bar towards the position illustrated in FIG. 17.

As mentioned previously the latch bars 227, 228 are interconnected to serve as a common tuning voltage bus. As shown the upper bearing rod 237 is provided with leaf-type contacts 227C, 228C that are axially biased against the upper ends of the latch bars to establish electrical contact therewith while accommodating required rotation of the latch bars. An insulated conductor wire 240 is bridged between the contacts 227C, 228C to complete the common tuning bus connections.

A separate insulated mounting strip 241,242 is provided along each of the vertically extending marginal edge regions of the base plate 231. Mounting strip 241 as viewed in FIG. 16 receives the fixed ends of the wiper leaves W3 to W8 for the six UHF channel positions and mounting strip 242 receives the fixed ends of the wiper leaves W9–W15 for VHF channel positions 2 to 13. Each wiper leaf is shown fixed in place by means of a screw and nut fastener 243 so that each leaf has one end free to flex or deflect in the fashion of a cantilever. As is best shown in FIG. 17, each wiper leaf has its free end 244 extending into partially overlapping relation with the rounded lobe cam portion 245 of the corresponding latch bar so that upon actuation by the corresponding push-button the free end of each wiper leaf swings through an arc which intercepts the profile of the rounded-lobe cam portion of the latch bar.

Normally, each wiper leaf, other than the actuated one, is in a relatively relaxed position adjacent to the base plate 231 where it holds the associated push-button projected. The free end 244 of the selected wiper leaf, in swinging along the travel arc towards raised position, cams against the profile face 245 of the corresponding latch bar to produce joint inward swinging movement of both latch bars. At the change-over position, the rising wiper leave clears the inwardly swinging profile face 245 and the latch bars return to normal position. The end portion 244 of the selected wiper leaf, upon release of its push-button, finally seats on the top edge of the profile face for the corresponding latch bar. In normal operation, whenever it is desired to select a new channel, the previously actuated wiper leaf which has remained in raised position will initially oppose the joint inward swinging movement of the latch bars but after limited inward swinging movement of the latch bars, the returning wiper leaf assists the inward swing of the latch bars. rising and the returning leaf springs tend to clear the profile face at approximately the same point so that the released wiper leaf returns to normal position before the acuated. wiper leaf reaches its maximum deflection.

Figure 16:
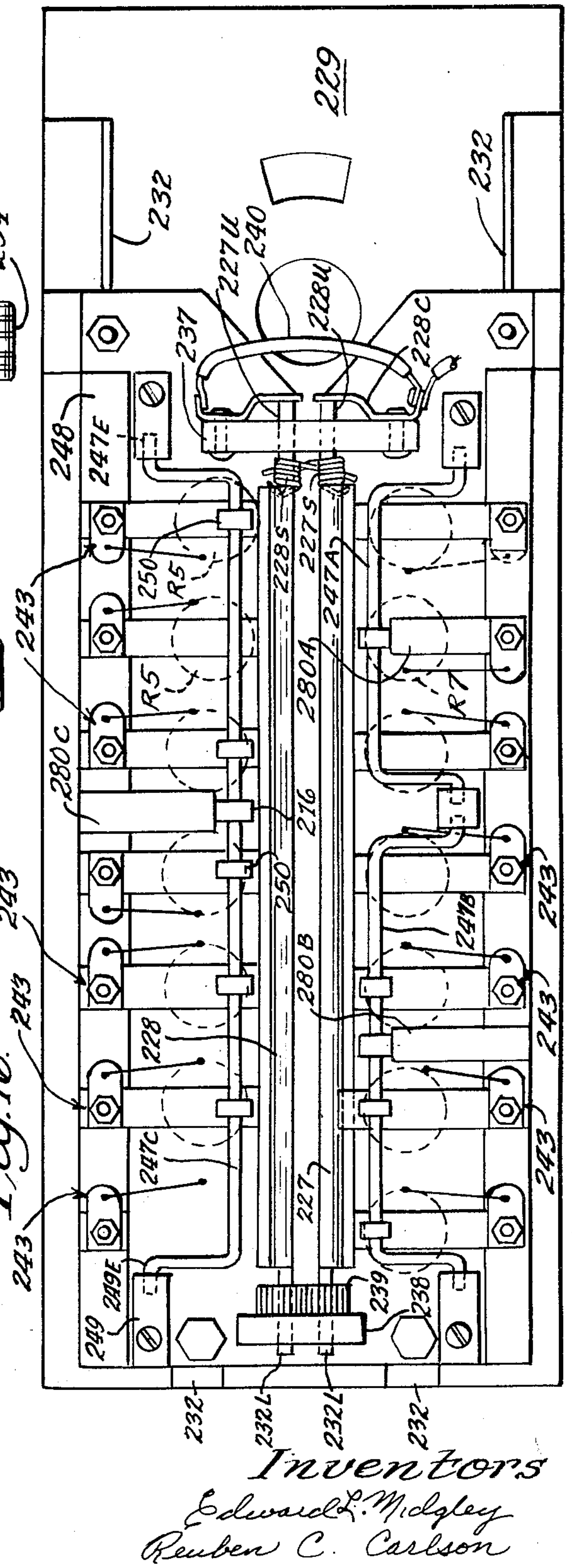
FIG. 16 is a rear elevational view of the tuner control embodiment of FIG. 11 and shows the mechanical arrangement of the latch bars and wiper leaves that are controlled by pushbuttons.

The mode of tuners 10, 15 is controlled by means of the switches 380A, 380B and 380C shown in FIG. 16 mounted to the base plate. These switches are identical to the switches 140A, 140B and 140C as described with reference to the embodiment of FIGS. 3–10 above.

Switch 280C is shown controlled by a common crank 247C that has offset stub ends 247E mounted in suitable bearing blocks 248, 249 provided on the rear face of the base plate. The crank 247C has stop rings or washers 250 of hard rubber or other suitable insulation material spaced therealong for mechanical engagement with each corresponding wiper leaf at the UHF channel positions. The actuation of any UHF channel push-button causes the rising wiper leaf to elevate the crank arm 247C as shown in FIG. 17 thereby closing switch 280C and to hold this position until the UHF wiper leaf is released for return to its normal position. A leaf spring 251 rides against the crank arm 247C to yieldingly bias the same towards its normal position.

In a similar manner, switches 280A and 280B for control of the low and high band modes respectively in the VHF tuner section 10, are respectively controlled by cranks 247A and 247B. The crank 247A overlies wiper leaves W9–11 which correspond to low band VHF positions 2–6 so that actuation of any high band channel push-button causes the rising wiper leaf to elevate the crank in a fashion to actuate switch 280A and to hold this position until the VHF low-band wiper leaf is released. Likewise, crank 247B overlies wiper leaves W12–15, which correspond to high-band VHF positions 7–13 so that actuation of any high-band channel push-button causes the rising wiper leaf to elevate the crank and to hold this position until the VHF high-band wiper leaf is released.

Thus, while preferred constructional features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. A solid state television tuner comprising selector means, means providing a plurality of channel selection settings individually selectable through actuation of said selector means, a wide band signal selecting circuit having tunable resonant circuit means including a solid state voltage variable capacitance selectively controllable in accordance with the level of applied voltage, a variable voltage source responsive to the selector means for providing a predetermined distinctive level of applied voltage for each channel selection setting, said voltage source including linearly voltage dividing tap means at each channel selection setting and connectable to apply voltage to said voltage variable capacitance when said selector means is actuated to the corresponding channel selection setting, and preset tuning means adjustable for independently controlling the voltage dividing action of only the particular voltage dividing tap means that is connected to said variable voltage capacitance for effecting fine tuning, said voltage source including circuit means providing first and second resistive path regions having different voltage gradient profiles, first and second contactors respectively engageable with said first and second resistive path regions to determine a voltage range between said contactors and movable in ganged relation along said resistive path regions to vary said voltage range, and an output potentiometer connected between said contactors having an adjustable output tap to provide a linear variation in output voltage within the voltage range determined by said contactors, said output tap constituting at least one of said voltage dividing tap means.

2. A solid state television tuner comprising selector means, means providing a plurality of channel selection settings individually selectable through actuation of said selector means, a wide band signal selecting circuit having tunable resonant circuit means including a solid state voltage variable capacitance selectively controllable in accordance with the level of applied voltage, a variable voltage source responsive to the selector means for providing a predetermined distinctive level of applied voltage for each channel selection setting, said voltage source including linearly voltage dividing tap means at each channel selection setting and connectable to apply voltage to said voltage variable capacitance when said selector means is actuated to the corresponding channel selection setting, and preset tuning means adjustable for independently controlling the voltage dividing action of only the particular voltage dividing tap means that is connected to said variable voltage capacitance for effecting fine tuning, said voltage source comprising means rotatable about a central axis and providing a plurality of resistive paths annularly spaced about said axis and extending parallel thereto, there being one of said paths for each of said channel selection settings, and circuit means for producing a voltage gradient lengthwise of said paths, said voltage dividing tap means comprising separate contactor means for each of said paths, each of said contractor means slidably engaging the corresponding one of said paths for lengthwise movement there-along, said selector means including means for indexing the rotatable means to individually electrically connect any one of said contactor means with said signal selecting circuit.

* * * * *